United States Patent [19]

Wright

[11] Patent Number: 4,988,427
[45] Date of Patent: Jan. 29, 1991

[54] LIQUID/SOLID SEPARATION UNIT

[76] Inventor: William E. Wright, 1201 W. Thornton Pkwy. #10, Thornton, Colo. 80221

[21] Appl. No.: 516,527

[22] Filed: Apr. 30, 1990

[51] Int. Cl.$^5$ .............................................. B01D 17/06
[52] U.S. Cl. .................... 204/304; 204/305; 204/307
[58] Field of Search ............... 204/186, 302, 222, 223, 204/304, 305; 210/181, 202; 202/234, 302; 134/1, 18

[56] References Cited

U.S. PATENT DOCUMENTS

| | | | |
|---|---|---|---|
| 1,034,668 | 8/1912 | Wright | 204/304 |
| 1,394,462 | 10/1921 | Alden et al. | 204/304 |
| 2,470,741 | 5/1949 | Gordon | 204/307 |
| 3,437,575 | 4/1969 | Gross et al. | 204/305 |
| 4,022,678 | 5/1977 | Wojcik et al. | 204/222 |
| 4,400,253 | 8/1983 | Prestridge et al. | 204/305 |

Primary Examiner—John F. Niebling
Assistant Examiner—Kishor Mayekar
Attorney, Agent, or Firm—Joseph C. Herring

[57] ABSTRACT

The flow of alternating current electrical power between electrode(s) and ground electrode(s) in contact with a working fluid is utilized in separating materials within the working fluid and to agitate the working fluid and separate contaminants within the fluid. The systems can be tubular or box-like and are controlled through sensors and a computer. The working fluids can be mineral ores, industrial wastes, contaminated earth, etc.

16 Claims, 4 Drawing Sheets

LIQUID/SOLID SEPARATION UNIT

SUMMARY OF THE ART

There is a substantial body of art relating to the use of electrical charges to break up suspensions and emulsions. Various Cottrell electrostatic precipitators, for example, are used to remove particles from air. Little heat need be involved. Electrical gradients provide the desired separation. The same phenomenon is used to separate suspended particles from water. Some of this art is discussed below.

Electrostatic dehydration of crude oil emulsions and mixtures was developed in the 1920s and 1930s, e.g., U.S. Pat. No. 1,562,712 issued to W. Meredith and U.S. Pat. No. 2,163,804 issued to H. Passler. These processes utilized high voltage AC, e.g., 20-15 kv with very low amperage. Thus, Passler teaches a system in which 10,000 kg of a water in crude oil emulsion (40% water) is rapidly rendered substantially water-free, using three phase 12,000 V AC and a power consumption of three kilowatt hours. Any solids were removed from the bottom of the unit. U.S. Pat. No. 2,640,026 issued to P. E. Whittington teaches an electrostatic filtration system using charged screens where water, organic liquids and solids are separated. U.S. Pat. No. 2,849,395 issued to H. A. Wintermute teaches multi-treatment systems where blade electrodes in a water/oil separated are in contact with, partially submerged in, or above the liquid being treated by alternating charges of 550-2200 V AC and DC currents.

A mobile unit for the electrostatic purification and filtration of nonconductive fluids is taught by U.S. Pat. No. 4,052,289 issued to T. Tobisu. A "truck" mounted unit is designed to remove minute metal grains normally not removed by filters. Other electrostatic type separators are taught in U.S. Pat. No. 3,672,127 issued to W. D. Mayse et al; U.S. Pat. No. 3,794,578 issued to F. D. Watson; U.S. Pat. No. 4,056,451 issued to R. A. Hodgson and U.S. Pat. No. 4,200,516 issued to K. E. Pope.

U.S. Pat. No. 3,977,935 by A. A. Kowarski discloses a system wherein liquids are evaporated to separate the liquids from solids. In this patent, sub-atmospheric pressures are used to evaporate the liquid. U.S. Pat. No. 4,437,768 discloses a system wherein a circulated fluid medium is used to heat water to steam for the purpose of separating the water from dissolved precipitated solids. It uses a mechanism for scraping the solids into a collection vessel.

Resistance heating has been used for decades. The heating has been done by heating a nickel/chrome or other resistor with appropriate electrical power. The resistor is generally enclosed within an electrical insulator or otherwise separated from the fluid. However, F. A. Lidbury et al, Trans American Electrochem. Soc. (Adv. copy), Vol. 40, (1921) (See C. A. Vol. 16,25 (1922) teach a laboratory size steam generator using water resistance heating built up of several concentric pipes as electrodes. The unit had no automatic controls.

The Lidbury et al unit was obviously not useful in the soil, etc. separation from fluids or for a variety of other chemical process arts. Further, it cannot be adapted for use in many commercial operations. The oil/water dehydration systems, similarly, do not appear to have found use outside their defined fields.

The resistance heating systems of this invention have wide utility in both portable and fixed facilities. In some instances, the unit can, when properly used, reduce or eliminate the need for stirring equipment. In some models, it can also make maximum use of available waste heat sources.

SUMMARY OF THE INVENTION

Solids and/or liquids can be separated from electrically conductive working fluids, e.g., slurries, solutions, and mixtures, in an electrical resistance heated unit. Alternating current is passed through electrodes into the working fluid(s), and leaves the working fluid(s) through ground electrode(s) in contact with the working fluid(s). The electrical power applied to the unit is sufficient to heat the working fluid(s) to desired temperatures and to provide by convection currents agitation. Sensors and controls are used to keep the unit operating within desired parameters. Additional separations are made in additional auxiliary separation units.

DETAILED DESCRIPTION OF THE DRAWINGS

Figure 1:
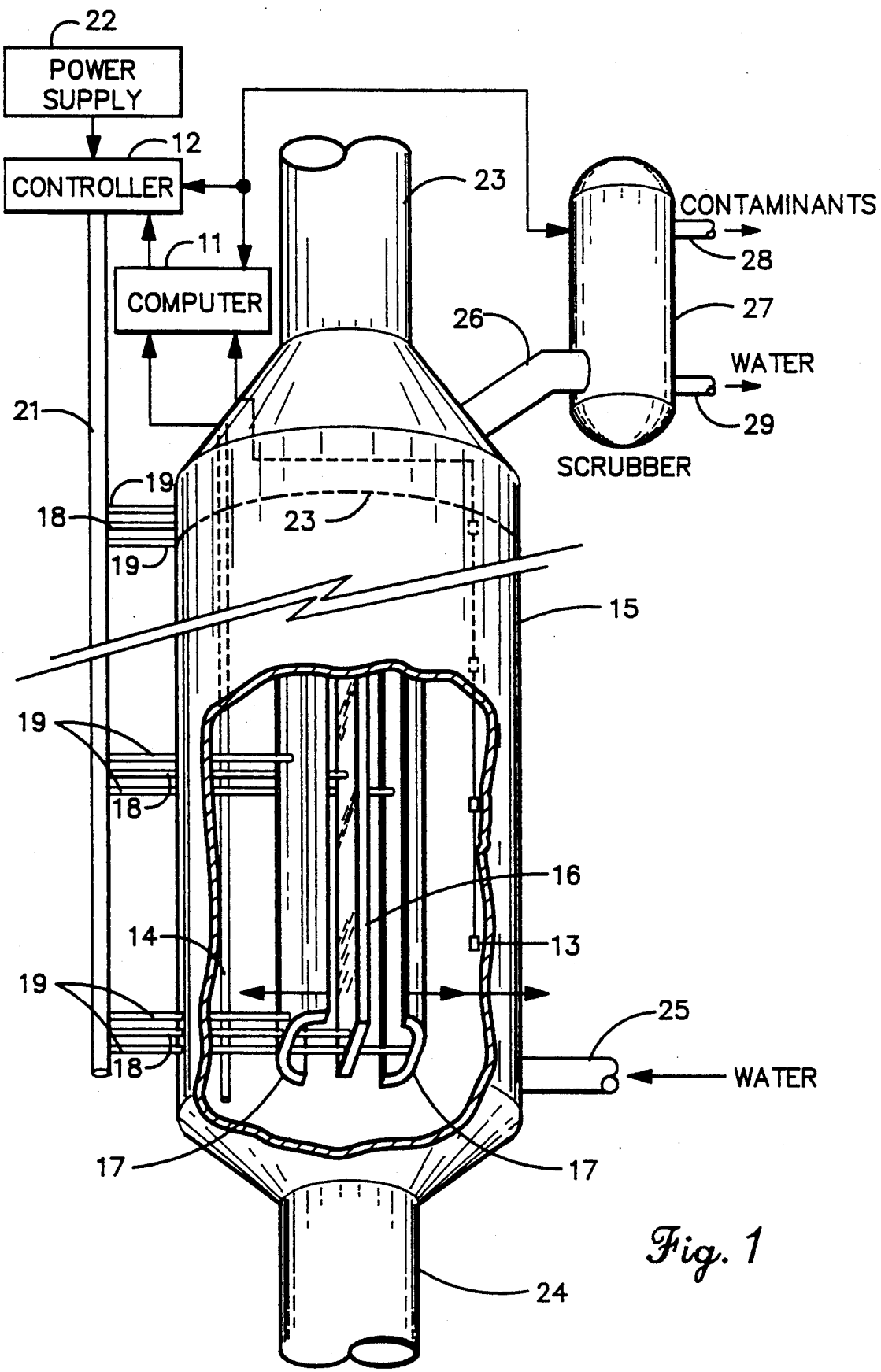
FIG. 1 is a partially cut-away view of a column and additional separator unit for use in a slurry separation process.

FIG. 1 depicts a computer controlled column for separating halocarbons or other volatile or soluble contaminants from aqueous soil slurries. During operation the unit is controlled by a preprogrammed computer 11. Computer 11 inputs into controller 12 and receives operating data from temperature sensors 13, liquid depth sensor 14 and the separator unit (scrubber) sensors (not shown). Column 15 is utilized for slurry or emulsoid decontamination. Column 15 has ground electrode 16 and electrodes 17 with their inner surfaces substantially equidistant from ground electrode 16. Cables 18 and 19 emerge from conduit 21 and are supplied by power supply 22 via controller 12. Cables 18 and 19 are insulated and are electrically connected to ground electrode 16 and electrodes 17, respectively. They also have seals (not shown) to prevent leakage from column 15. Nonconductive supports (not shown) position the electrodes 16 and 17. Column 15 has an inlet 23 and outlet 24. The flow of fluids (liquids, slurries and fluent solids) into and out of the column 15 is controlled by star valves (not shown). Column 15 has a water inlet pipe 25 and a steam effluent pipe 26 connected to a scrubber 27. Scrubber 27, in the design described, exhausts halocarbon through outlet 28 and the condensed water through water effluent outlet 29.

Figure 2:
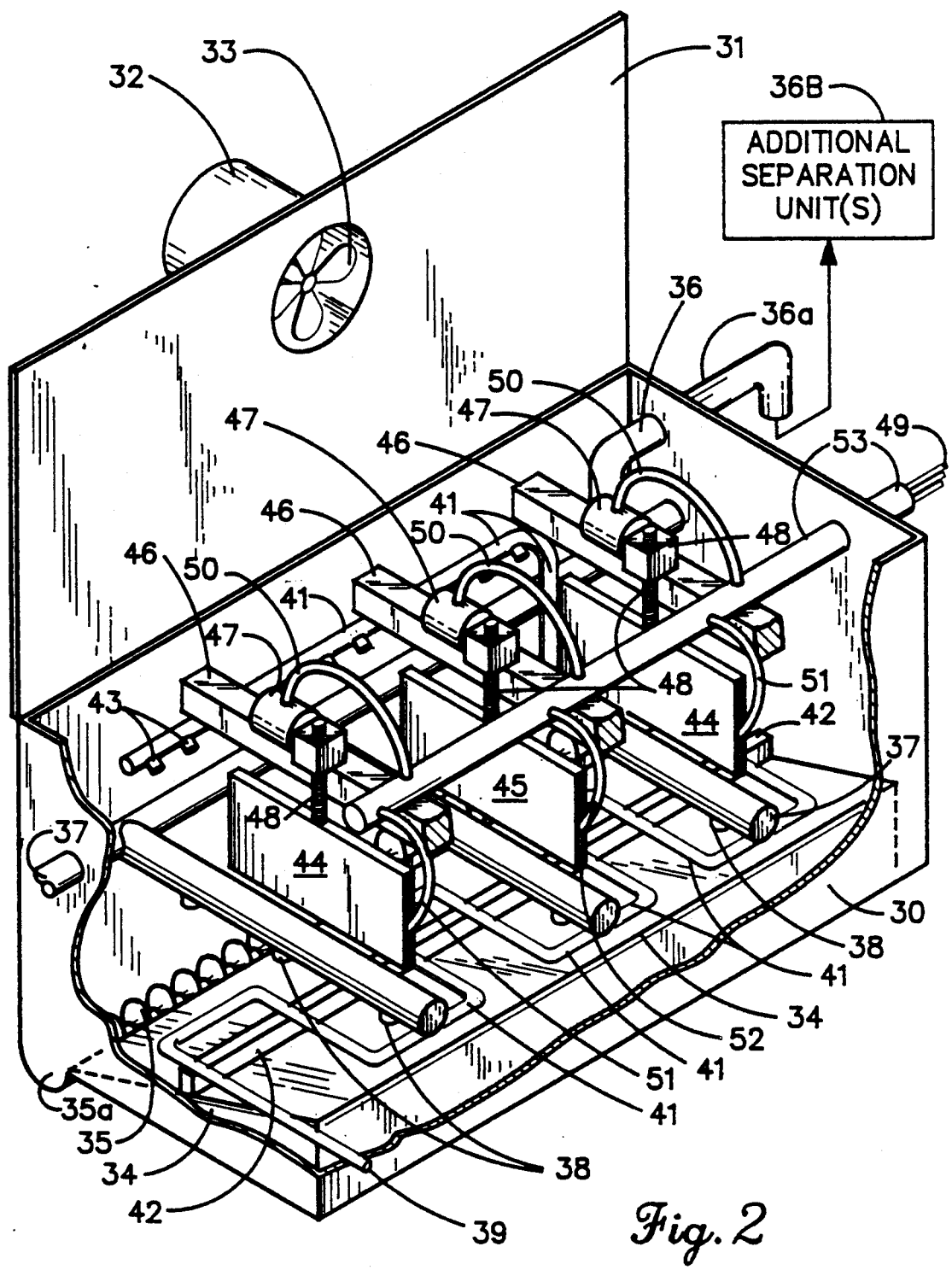
FIG. 2 is a cut-away view of a portable unit for use in the removal of contaminants and particulates from slurries of earth or other particulates in water.

FIG. 2 is a simplified cut-away of a field unit for separating solids and water from suspensions, slurries, etc. formed in oil drilling operations. The unit is made up of a box 30 with a top 31. The top 31 is attached to box 30 by a hinge (not shown). A vent stack 32 includes an exhaust fan 33. The box 30 has an angled floor 34 along which solids move until they come into contact with screw conveyor 35 which conveys the solids along a recess 35a in the floor 34. Conveyor 35 moves the solids to a vertical conveyor 36 which transports the solids upwardly until they fall outwardly into an exit pipe 36a where they are conveyed laterally toward the downspout. The wet solids are moved to one of several possible additional separation units 36b, e.g., a dryer.

Waste hot gases from nearby combustion-type engines are introduced into the water within box 30 through manifold distributor 37 with its nozzles 38. Slurry is introduced through inlet 39 and line 41. Line 41 is designed for good heat transfer and is supported by at least one beam 42. The slurry is sprayed into box 30 through the nozzles 43 in line 41. Slurry line 41 and nozzles 43 are depicted on the wall of the box 30 at a point higher than their normal position on the wall for demonstration purposes. Additional lines 41 and nozzles can be located on the near or end walls.

The primary heat supply for the unit is provided by electrodes 44 which pass three-phase electricity to ground electrode 45 via the slurry and/or fluid mixture. Electrodes 44 and 45 are supported by partially cutaway beams 46 and are raised and lowered by reversible electric motors and gearing 47 which can lift and lower one or both the electrodes 44 and 45 through the supporting screws 48. Electrical power flows into and out of the unit through cables 49. Electrical power flows into motors 47 and into electrodes 44 via cables 50 and 51, respectively. The electrical power exits through ground 45 and cable 52. Cables 50, 51 and 52 enter and exit the unit through conduit 53. Water which does not exit as steam flows out a valved outlet (not shown) on the rear of the unit. The electrical flux is concentrated between electrodes 44 and 45 and grounding of box 30 is sometimes not necessary. Prudence, however, requires that the box 30 should be grounded.

Figure 3:
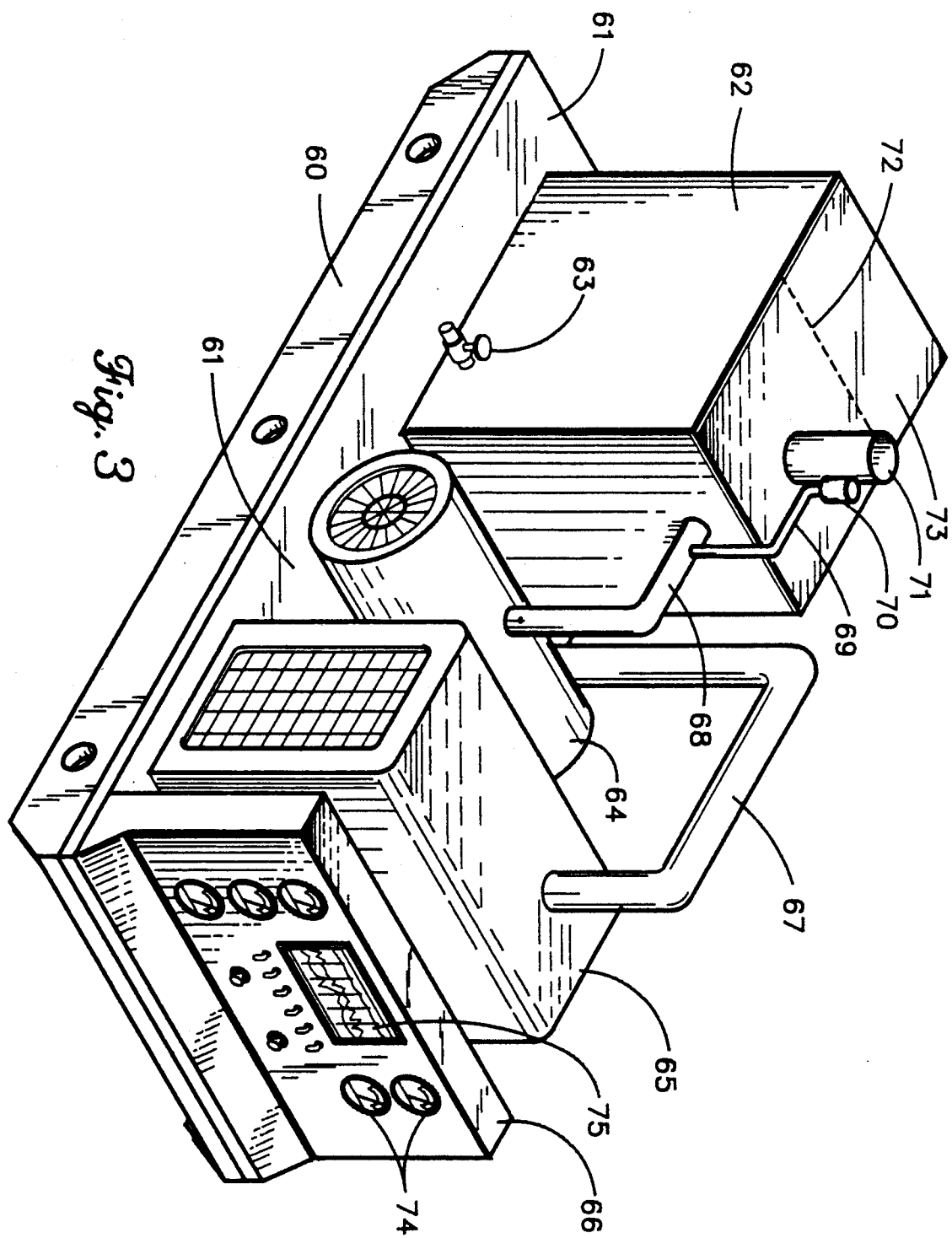
FIG. 3 is a view of a skid-mounted portable unit.

FIG. 3 shows a skid mounted unit. The unit is made up of skids 60 attached to the bottom of platform 61, a separator box 62 with a valved inlet 63, a generator 64, a diesel engine 65 which drives the generator via gearing (not shown), and a control panel 66. Exhaust gases pass through insulated exhaust duct 67 into box 62 as shown in the unit of FIG. 2. Electrical power from generator 64 is delivered to box 62 through conduit 68. Cables (not shown) in secondary conduit 69 carry electrical power to fan motor 70 mounted on the side of vent stack 71. A hinge 72 attaches a cover 73 to the rear half of the top of box 62.

Figure 4:
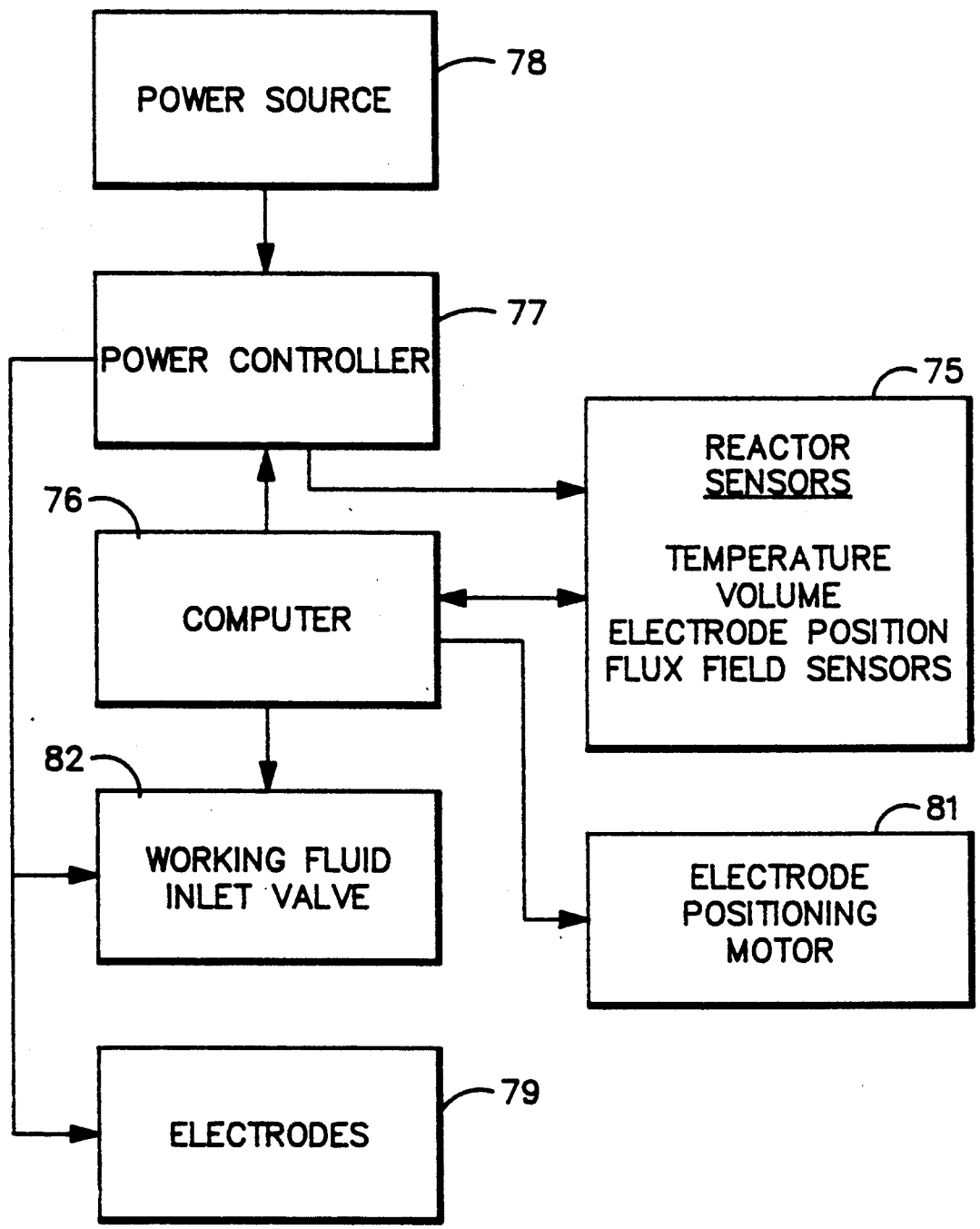
FIG. 4 depicts a block diagram of a control system for the separator of FIG. 2.

FIG. 4 is a block diagram of a control system for a FIG. 2 type opeating system. Reactor sensors 75 measure fluid temperature and volume, the depth of the electrodes in the fluid and the flux field densities. The sensed data is input to computer 76. Computer 76 outputs to the power controller 77 which controls the current flow from power source 78 to electrodes 79. It also controls the power to the reactor sensors 75, and the electrode positioning motor 81.

GENERAL DESCRIPTION OF THE INVENTION

The separation units of this invention have been described in terms of columns and boxes, but other configurations are equally operable. FIG. 3 discussed a skid-mounted unit suitable for use with a truck, lowboy, or helicopter but, in modified form, the unit can be widely used, for example, in oil spill cleanup operations. Thus, a barge could be used as a box with the generators, any additional separators, etc. on deck. A skimmer would be used to collect the spilled oil and the oil/water mixture pumped into the barge for separation. The hold of a boat or ship can also be used and is particularly effective where the bow of the vessel is equipped with a skimming device for collecting the spilled hydrocarbon.

The primary and additional separator units should have containers and components which are designed for the desired working fluid make-up and throughput. They should be substantially chemically inert to the working fluid(s) and separation conditions. To the extent possible, the separator units, sensors, valves, agitation and other equipment and components should be from that which is commercially available and practical for use with the specified working fluid(s).

The controllers for the system are electrical or electromechanical and are operated by a preprogrammed computer of sufficient capacity and speed for the required sensor monitoring, control switching, valve and electrode motor operation, etc. Separation units in addition to the primary unit will be required for many processes. These can be, for example, a liquid/liquid separator, a liquid fractionator, a liquid/gas separator, a liquid/solid separator, a gas/solid separator, etc. Thus, the additional separators can be unit operations as different as a centrifuge, a distillation tower, a magnetic separation unit, a flocculation unit, an oil/water separator, a solids dryer, or a mineral flotation unit. Generally, liquids will be separated from solids in either types of separators (tubular or box-like) but additional separation is generally required for most decontamination, mineral recovery, etc. operations.

The electrodes include input and ground electrodes and can have various shapes. These shapes permit the flow of fluids through, around and between the electrodes and ensure mixing of the components of the working fluid. The configurations of the electrodes are determined, in part, by the shape of the container. The shape of the electrode can also be varied too spread out or focus the electrical flux field and to provide agitation by the convection currents generated by the flux field. An electrode can be flat, curved, or in one or more pieces. Multi-part electrodes can be used to spread the flux pattern. The use of ground electrodes which are smaller than the input electrodes creates a smaller flux field pattern. Thus, it is preferable to utilize curved electrodes within a round tower. Preferably, the input electrodes for "box" configurations are "blade" electrodes which are preferably noncylindrical, nontubular and, in rectangular or cylindrical containers, look like square or rectangular metal forms in or protruding into the fluid.

Electrode "size", for purposes of this invention, is the area of electrode within the working fluid. Thus it includes electrodes of a predetermined size when completely immersed in the working fluid and a predetermined portion of an electrode submerged within such fluid.

The power requirements for a unit will be determined in part by the volume, polarity and content of the working fluid. As a result, additives, e.g., salts, may be needed to provide a desired degree of working fluid conductivity. The electrical and chemical characteristics of the solids in the working fluid can influence the electrical requirements. Thus, conductive ores and industrial waste particles and their solubility and ionizability will influence both the liquid selection and the power design parameters. High volume working fluid throughputs will require a higher power throughput than a lower throughput unit.

The power required to create the flux field can be controlled by regulating either or both of the voltage or alternating current flow. Preferably, a voltage will be used that is readily available from commercial sources and/or available equipment; e.g., alternating current 220 V, 440 V and 660 V. The same is true with respect to the frequency of the alternating current, e.g., 60 Hz in the United States. The desired amperage will also be determined by the unit size. Thus, a unit like that described in FIGS. 2 and 3 will utilize from about 100 to 400 amps of 240V electricity at various stages in its operation. Larger units or high throughput units like the one depicted in FIG. 1 can utilize much higher voltages and amperages.

The amount and shape of the electrical flux field can be closely controlled, in part, by regulating the electrode size and shape, electrical power applied, the area of the electrodes in the working fluid, and/or the conductivity of the fluid being treated. The electrical flux field between and around the electrodes and ground electrode(s) can be used to provide much or all of the needed stirring or mixing. Nonreactive gases, e.g., flue gas, can supplement the agitation of the working fluid caused by the electrical flux field.

The working fluids are mixtures or slurries of solids or semi-solids in an ionizable liquid. The solid contents of the working fluids can range from contaminated earth to tar sands to ores and industrial wastes with soluble components. The liquids can be organic or inorganic or mixtures of both. The contaminants can be hydrocarbons, halocarbons, amines, etc., heavy or other metal ions, and a variety of other materials in which are dissolved in, mixed with, suspended in or sorbed on at least one of the solid and/or liquid making up the working fluid. If the dispersed solid particles are electrical conductors, the amount of particles within the working fluid should be low enough to avoid electrical bridging and accompanying shorts. The solids can be contaminated or can be sorbants for contaminants of the liquid in the working fluid. The semi-solids can be ion exchange resins in the gel form or hydrogels.

The conductivity of the working fluid is an important parameter in establishing a desirable electrical flux field. The conductivity is determined by its natural and/or induced polarity and ionization. Thus, distilled water is a poor working fluid but the addition of an acid, base or salt; e.g., HCl, NaOH, and NaCl will provide the water with sufficient ionization to create the desired flux field. Similarly, salts, acids and/or bases can be used to provide sufficient ionization to create a desired flux field where the working fluid is organic, e.g., alcohols, esters, etc. The water and the other working fluids have known ionization constants and the effect of various concentrations of water, acids, bases or salts on ionization in such fluids is also known and can be determined from handbooks, texts, etc.

The viscosity of the working fluid may require the use of agitation or mixing beyond that provided by the flux field, countercurrent fluid flows, etc. In such cases, conventional mixing equipment can be added to the unit. The following examples typify the utility of the devices.

EXAMPLE 1

A rectangular box-like stripping unit of the type of FIG. 3 is used to strip hydrochloric acid, ethylene dichloride, and other halo organic contaminants from contaminated earth removed from the site of a leaking storage tank. The stripping unit is 4×4×8 feet with electrodes which are 24×8×¼ inches in size. The unit is driven by a 350 watt portable generator unit made up of a model 3208 diesel engine and a SR-4 model generator, both marketed by the Caterpiller Tractor Company, and a control panel. The unit outputs three-phase AC of 240 or 480 V AC.

The contaminated earth is screened to 20 mesh. The earth is mixed with water to form a pumpable slurry. The stripping unit is filled with 2-2½ feet of tap water. The electrodes are immersed in the water and start-up is begun with 100 amps of 250V AC. The amperage is gradually increased toward 350 amps over a period of about 1½ hours. At this point there is a high volume of steam being removed by the vent fan with a very turbulent boiling of the water. The exhaust gas from the diesel engine, having a temperature of about 900 degrees F, is pumped through the water in the stripping unit. After the start-up is completed, the earth slurry is pumped into the stripping unit at a rate sufficient to continue the rapid boiling of the water and the high degree of turbulence.

On introduction of the slurry, the steam effluent of the stripping unit contains the halogenated hydrocarbon contaminants and a portion of the NaCl. The halogenated hydrocarbons in the effluent are removed in a post-treatment condensation unit. The decontaminated earth is removed from the stripping unit with a screw conveyor and centrifuged to substantial dryness.

EXAMPLE 2

A drilling rig mud pit is cleaned up with a mobile unit of the type of FIG. 3 to which a cyclone separator, bagging equipment, etc. are added. The mobile clean-up unit is designed to handle 1500 barrels per day water and is mounted on a flatbed trailer. The unit is powered by a generator outputting 600–800 kw electricity.

The pit, containing about 50,000 barrels of water, caustic soda, barite, sulfates, bentonite, etc. must be cleaned up prior to restoring the pit site to normal use. The unit is filled and started. Once start-up is completed, a float valve controls the water input from the pit and the power input. The control panel is used throughout start-up and operations for monitoring and control purposes. The precipitating solids exit the clean-up unit via a suction line at the bottom of the tank, are contrifuged to substantial dryness and bagged for proper disposal.

EXAMPLE 3

Mixtures of bitumen and sand (tar sands) are treated in a unit of the type of FIG. 1 to remove the bitument. The heat reduces the viscosity of the hydrocarbon. Chemical, such as NaOh, NH$_4$OH, detergents, etc. can be added to hasten release of the bitumen from the sand particles. Lower molecular weight hydrocarbon or other solvent can also be added to reduce the average hydrocarbon specific gravity and viscosity. The heat, in this situation, is preferably kept below the boiling point of the solvent under ambient conditions while the tar/-hydrocarbon mixture is in the column. The sand settles out and is removed from the bottom of the unit. The separation of the hydrocarbon takes place in a distillation column.

Halocarbon, e.g., ethylene dichloride, solvents contaminating earth or ground can be similarly separated.

I claim:

1. A system for the separation of working fluids comprising:
   a container for working fluid(s);
   movable electrode means and movable ground electrode means, positioned within the container means, for providing, on application of predetermined alternating current, electric power,
(a) a predetermined electrical flux field within a predetermined volume of working fluid within the container, and
(b) convection current agitation within the predetermined volume of working fluid;

sensor means for sensing at least one of (a) the position(s) of electrode means and ground electrode means within the container, (b) the volume of a working fluid within the container, (c) the temperature of a working fluid, (d) the electrical flux field size; and (e) electrical flux field density;

controller means foar regulating, during the application of predetermined alternating current electrical power, at least one of electrode and ground electrode position(s), flux field size, flux field density, working fluid volume, working fluid temperature; and means for positioning at least one of the electrode and the ground electrode means.

2. A system for the separation of working fluids comprising:

a container for working fluid(s);

movable electrode means and movable ground electrode means, positioned within the container means, for providing, on application of predetermined alternating current, electrical power,
(a) a predetermined electrical flux field within a predetermined volume of working fluid within the container, and
(b) convection current agitation within the predetermined volume of working fluid;

sensor means for sensing at least one of (a) the position(s) of electrode means and ground electrode means within the container, (b) the volume of a working fluid within the container, (c) the temperature of a working fluid, (d) the electrical flux field size; and (e) electrical flux field density;

controller means for regulating, during the application of predetermined alternating current electric power, at least one of electrode and ground electrode position(s), flux field size, flux field density, working fluid volume, working fluid temperature; means for positioning at least one of the electrode and ground electrode means, and auxillary separation unit means.

3. The system of claim 1 or 2 wherein the container is a tubular countercurrent flow unit.

4. The system of claim 1 or 2 wherein the container is a box-like unit.

5. The system of claim 2 wherein the auxiliary separation unit is a liquid/liquid separator.

6. The system of claim 2 wherein the auxiliary separation unit is a liquid/solid separator.

7. The system of claim 2 wherein the auxiliary separation unit is a centrifuge.

8. The system of claim 2 wherein the auxiliary separation unit is a distillation tower.

9. The system of claim 2 wherein the auxiliary separation unit is a magnetic separator.

10. The system of claim 2 wherein the auxiliary separation unit is a flocculation unit.

11. The system of claim 2 wherein the auxiliary separation unit is a flotation unit.

12. The system of claim 2 wherein the auxiliary separation unit is an oil/water separator.

13. The system of claim 1 including a plurality of auxiliary separation units.

14. The system of claim 1 or 2 further including an alternating current power generation means.

15. The system of claim 1 or 2 further including a platform supported by a skid.

16. The system of claim 1 or 2 further including an exhaust fan means.